(12) United States Patent     (10) Patent No.:   US 12,634,604 B2

Yang et al.     (45) Date of Patent:    May 19, 2026

(54) IMAGE SENSOR WITH TRANSMISSION CONTROL AND CONTROL METHOD THEREOF

(71) Applicant: SMARTSENS TECHNOLOGY(HK) CO., LIMITED, HK (CN)

(72) Inventors: Guang Yang, Shanghai (CN); Shengxin Zhang, Shanghai (CN); Jing Yang, Shanghai (CN)

(73) Assignee: SMARTSENS TECHNOLOGY(HK) CO., LIMITED, HK (CN)

( * ) Notice: Subject to any disclaimer, the term of this patent is extended or adjusted under 35 U.S.C. 154(b) by 28 days.

(21) Appl. No.: 18/755,745

(22) Filed: Jun. 27, 2024

(65) Prior Publication Data

US 2025/0193547 A1     Jun. 12, 2025

(30) Foreign Application Priority Data

Dec. 12, 2023   (CN) .......................... 202311705465.2
Dec. 12, 2023   (CN) .......................... 202323391154.1

(51) Int. Cl.
    *H04N 25/771*     (2023.01)
    *H04N 25/59*     (2023.01)
    *H04N 25/766*     (2023.01)
    *H04N 25/78*     (2023.01)

(52) U.S. Cl.
    CPC ........... *H04N 25/771* (2023.01); *H04N 25/59* (2023.01); *H04N 25/766* (2023.01); *H04N 25/78* (2023.01)

(58) Field of Classification Search
    CPC .... H04N 25/771; H04N 25/59; H04N 25/766; H04N 25/78
    See application file for complete search history.

(56) References Cited

U.S. PATENT DOCUMENTS

2022/0264038 A1*   8/2022   Innocent .............. H04N 25/771

* cited by examiner

*Primary Examiner* — Nicholas G Giles
(74) *Attorney, Agent, or Firm* — IPRTOP LLC

(57) ABSTRACT

An image sensor and a control method thereof. The image sensor includes pixel blocks arranged in an array. A photosensitive unit and an overflow unit are coupled to a transmission node, a reset unit and a readout unit are coupled to a floating diffusion node; and a transmission control unit is coupled between the transmission node and the floating diffusion node. The photosensitive unit converts optical signals into first/second charge signals; the transmission control unit controls a transfer path between the transmission node and the floating diffusion node, so that the second charge signal is transferred to the overflow unit in an exposure phase, and the first charge signal and the second charge signal are read out in a quantization phase; the reset unit resets the transmission node and the floating diffusion node; the readout unit reads out the first charge signal and the second charge signal.

15 Claims, 11 Drawing Sheets

IMAGE SENSOR WITH TRANSMISSION CONTROL AND CONTROL METHOD THEREOF

CROSS REFERENCE TO RELATED APPLICATION

The present application claims the benefit of priority to Chinese Patent Application No. 202311705465.2, entitled "IMAGE SENSOR AND CONTROL METHOD THEREOF", and Chinese Patent Application No. 202323391154.1, entitled "IMAGE SENSOR", both filed with CNIPA on Dec. 12, 2023, the disclosure of which is incorporated herein by reference in its entirety for all purposes.

FIELD OF THE INVENTION

The present disclosure generally relates to the technical field of image sensors, and in particular to an image sensor and a control method thereof.

BACKGROUND OF THE INVENTION

Image sensors are now a common feature in devices, such as digital cameras, mobile phones, and medical and automotive equipment. As the technology behind Complementary Metal-Oxide-Semiconductor (CMOS) sensors continues to advance rapidly, expectations for image quality are also on the rise.

Basic functions of the image sensor include the exposure storage and transfer quantization of charge. During the exposure storage process, due to the limited capacity of photosensitive elements' potential wells to accommodate charge, once charge fills the potential wells, overflow will occur. The overflow charge is stored by a floating diffusion node FD, which will inevitably lower the potential of the floating diffusion node FD. Once the potential of the floating diffusion node FD is too low, it will cause abnormalities in nearby transistors, which will cause "black sun", resulting in poor image quality.

Therefore, how to avoid black sun and improve image quality is a technical challenge for those skilled in the art.

SUMMARY OF THE INVENTION

In view of the disadvantages of the above-described related technology, the present disclosure provides an image sensor and a control method thereof for solving the problem that existing image sensors are prone to have poor image quality due to black sun.

The present disclosure provides an image sensor, including pixel blocks spaced apart in an array, wherein each of the pixel blocks includes a photosensitive unit, an overflow unit, a transmission control unit, a reset unit, and a readout unit.

The photosensitive unit and the overflow unit are respectively coupled to a transmission node, the reset unit and the readout unit are respectively coupled to a floating diffusion node, and the transmission control unit is coupled between the transmission node and the floating diffusion node.

The photosensitive unit is configured to convert optical signals it receives into charge signals, wherein the charge signals include a first charge signal and a second charge signal.

The transmission control unit is configured to control a conduction status of a transfer path between the transmission node and the floating diffusion node, so that the second charge signal is transferred to the overflow unit via the transmission node in an exposure phase, and the first charge signal and the second charge signal are read out based on the floating diffusion node in a quantization phase.

The reset unit is configured to reset the transmission node and the floating diffusion node, and the readout unit is configured to read out the first charge signal and the second charge signal.

Optionally, the photosensitive unit includes one or more photosensitive elements and corresponding transmission transistors, a control terminal of each transmission transistor receives a first transmission control signal, a first terminal of each transmission transistor is coupled to the transmission node, and a second terminal of each transmission transistor is coupled to a first reference potential via the corresponding photosensitive element;

and/or, the transmission control unit includes a transmission control transistor, a control terminal of the transmission control transistor receives a second transmission control signal, a first terminal of the transmission control transistor is coupled to the transmission node, and a second terminal of the transmission control transistor is coupled to the floating diffusion node;

and/or, the overflow unit includes an overflow transistor and an overflow capacitor, a control terminal of the overflow transistor receives an overflow control signal, a first terminal of the overflow transistor is coupled to the transmission node, and a second terminal of the overflow transistor is coupled to a second reference potential via the overflow capacitor.

Optionally, the overflow unit includes the overflow capacitor, the overflow capacitor corresponds to a first wiring, the reset unit corresponds to a second wiring, wherein a first plate of the overflow capacitor receives the second reference potential via the first wiring, and a second plate of the overflow capacitor receives a first power supply potential via the second wiring, wherein the overflow capacitor is reset when simultaneously receiving the second reference potential and the first power supply potential.

Optionally, the reset unit includes a reset transistor, a control terminal of the rest transistor receives a reset control signal, a first terminal of the rest transistor is coupled to the first power supply potential, and a second terminal of the rest transistor is coupled to the floating diffusion node;

and/or, the readout unit includes a source follower transistor and a select transistor, a control terminal of the source follower transistor is coupled to the floating diffusion node, a first terminal of the source follower transistor is coupled to a second power potential, a second terminal of the source follower transistor is coupled to a first terminal of the select transistor, a control terminal of the select transistor receives a select control signal, and a second terminal of the select transistor is coupled to a bit line;

and/or each of the pixel blocks further includes a gain unit coupled between the reset unit and the floating diffusion node for switching between different conversion gains, and the gain unit includes a gain transistor, a control terminal of the gain transistor receives a gain control signal, a first terminal of the gain transistor is coupled to the reset unit, and a second terminal of the gain transistor is coupled to the floating diffusion node.

Optionally, each of the pixel blocks includes a first device area and a second device area, the first device area includes the photosensitive unit, the second device area includes the overflow unit, the transmission control unit, the reset unit, and the readout unit, wherein the first device area and the second device area of the same pixel block are spaced apart along a first direction, first device areas of different pixel blocks are spaced apart along a second direction, and second device areas of different pixel blocks are spaced apart along the second direction, and there is a non-zero angle between the first direction and the second direction.

Optionally, in each second device area, the overflow unit extends from the corresponding first device area in the second direction via the transmission node, the transmission control unit extends from the first device area in the first direction via the transmission node, the readout unit and the transmission control unit are spaced apart in the second direction, and the readout unit and the overflow unit are spaced apart in the first direction.

Optionally, each of the pixel blocks includes a third device area and a fourth device area arranged adjacently, the third device area includes the photosensitive unit, and the fourth device area includes the overflow unit, the transmission control unit, the reset unit, and the readout unit, wherein the overflow unit and the transmission control unit extend from the third device area and are symmetrically arranged on two sides of a first central axis of the fourth device area.

Optionally, for each of the pixel blocks: the readout unit is further away from the third device area than the overflow unit and the transmission control unit are, and corresponds to the first central axis; and/or the overflow unit extends in a third direction, which forms a first angle with a row direction, the transmission control unit extends in a fourth direction, which forms a second angle with the row direction, the readout unit extends in the row direction, the gain unit extends from the transmission control unit in the fourth direction when the pixel block includes a gain unit, the reset unit extends in the fourth direction, and there is a distance between the gain unit and the reset unit; and/or memory elements of the overflow unit are at least disposed in a substrate; and/or the third device area has a second central axis, and the photosensitive unit includes a first sub-transmission element and a second sub-transmission element, which are symmetrically arranged on two sides of the second central axis; and/or, the photosensitive unit includes a first sub-photosensitive element and a second sub-photosensitive element arranged on two sides of the third device area, and the overflow unit and the reset unit in the fourth device area are correspondingly arranged on the two sides of the first central axis to achieve overflow signal acquisition based on the first sub-photosensitive element, and conversion signal acquisition based on the second sub-photosensitive element; and/or, each sub-transmission element of the photosensitive unit includes a vertical transfer gate, and the pixel blocks include square structures.

Optionally, a ratio of a charge storage capacity associated with the overflow unit to a charge storage capacity associated with the transmission node is in the range of (10-50):(0.01-0.5); when the pixel block further includes a gain unit, a ratio of a low-conversion-gain charge storage capacity associated with the gain unit to a charge storage capacity associated with the transmission node is in the range of (1-20):(0.01-0.5), and a ratio of a high-conversion-gain charge storage capacity associated with the gain unit to a charge storage capacity associated with the transmission node is in the range of (0.5-2):(0.01-0.5).

The present disclosure further provides a control method of the image sensor, and the control method includes:

a reset phase: performing a first reset operation on the transmission node, the floating diffusion node, and the photosensitive unit;

an exposure phase: turning on the overflow unit, and disconnecting the transfer path between the transmission node and the floating diffusion node through the transmission control unit, so that the second charge signal is transferred to the overflow unit via the transmission node.

Optionally, the control method further includes:

a quantization phase: turning off the overflow unit, and connecting the transfer path between the transmission node and the floating diffusion node through the transmission control unit to perform quantitative readout of a first reset signal and the first charge signal based on the floating diffusion node;

and/or, turning on the overflow unit to perform quantitative readout of the second charge signal based on the transmission node and the floating diffusion node; and performing a second reset operation on the transmission node and the floating diffusion node, to perform quantitative readout of a second reset signal based on the floating diffusion node.

Optionally, in the quantization phase:

the first charge signal and the first reset signal are read before the second charge signal and the second reset signal are read, the first reset signal is read before the first charge signal is read, the second charge signal is read before the second reset signal is read, achieving quantitative readout based on the floating diffusion node;

or the second charge signal and the second reset signal are read before the first charge signal and the first reset signal are read, the second reset signal is read before the second charge signal, and the first reset signal is read before the first charge signal, achieving quantitative readout based on the floating diffusion node.

Optionally, in the quantization phase, after a select transistor of the readout unit is turned on, an overflow transistor of the overflow unit is first turned off and then a transmission control transistor of the transmission control unit is turned on; and/or, off-intervals of the selector transistor are controlled to include on-intervals of the transmission transistor during which time the transmission transistor is turned on for charge transfer; and/or, during quantization of the second reset signal corresponding to the second charge signal, the reset transistor of the reset unit is controlled to be turned on and then off based on a conduction status of the select transistor, wherein each time the reset transistor is turned off, the select transistor is in one of its off-intervals.

Optionally, when each of the pixel blocks includes a gain unit, the control method further includes:

a quantization phase: turning off the overflow unit, connecting the transfer path between the transmission node and the floating diffusion node through the transmission control unit, performing quantitative readout of the first reset signal under different conversion gains based on the floating diffusion node by controlling the gain unit to be first turned on and then turned off, and performing quantitative readout of the first charge signal under different conversion gains based on the floating diffusion node by controlling the gain unit to be first turned off and then turned on;

and/or, turning on the overflow unit to perform quantitative readout of the second charge signal based on the transmission node and the floating diffusion node; and performing a second reset operation on the transmission node and the floating diffusion node, to perform quantitative readout of a second reset signal based on the floating diffusion node.

Optionally, before quantitative readout of signals in the exposure phase is performed, an extra reset operation is performed on the transmission node and the floating diffusion node.

The presently disclosed image sensor and control method thereof introduce a transmission node in addition to the existing floating diffusion node, managed by the transmission control unit. The transmission node has a minimal charge storage capacity and therefore even in the event of charge overflow, its influence on the floating diffusion node's potential during quantitative readout is negligible, which significantly reduces the likelihood of black sun. If the charge stored by the transmission node is cleared before the quantitative readout to avoid black sun, the cleared charge will also have a minimal effect on the accuracy of the overflow charge's quantitative readout. This ensures the precision of the sensor's performance.

Figure 1:
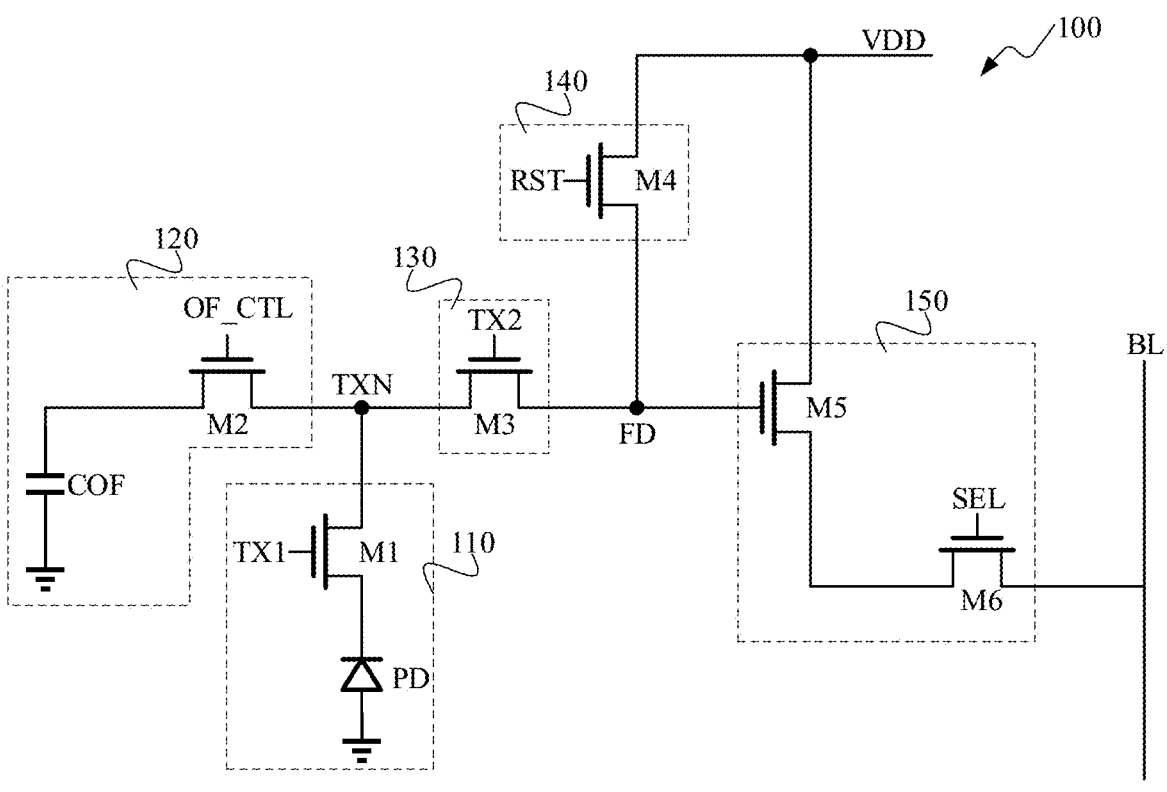
FIG. 1 is a schematic structural diagram of an image sensor according to Embodiment 1.

| Reference Numerals | |
| --- | --- |
| 100 | Pixel Block |
| 110 | Photosensitive unit |
| 120 | Overflow Unit |
| 130 | Transmission control unit |
| 140 | Reset unit |
| 150 | Readout unit |
| 160 | Gain unit |

DETAILED DESCRIPTION

The embodiments of the present disclosure will be described below. Those skilled can easily understand advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Refer to FIGS. 1-11. It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

Embodiment 1

As shown in FIG. 1, the present embodiment provides an image sensor including pixel blocks 100 arranged in an array, wherein the array includes multiple rows and columns. Each pixel block 100 includes a photosensitive unit 110, an overflow unit 120, a transmission control unit 130, a reset unit 140, and a readout unit 150.

The photosensitive unit 110 is coupled to a transmission node TXN, and configured to convert optical signals it receives into charge signals, wherein the charge signals include a first charge signal and a second charge signal.

In practice, the first charge signal may be a charge signal corresponding to the charge in the potential well, and the second charge signal may be a charge signal corresponding to the overflow charge. When the amount of charge sensed by the photosensitive unit 110 does not reach an overflow state, the photosensitive unit 110 converts the optical signals into only the first charge signal, which is stored in the photosensitive unit 110. At this time, the second charge signal can be considered to be zero. When the amount of charge sensed by the photosensitive unit 110 reaches an overflow state, the photosensitive unit 110 converts the optical signals into the first charge signal, which is stored in the photosensitive unit 110, and the second charge signal, which is stored in the overflow unit 120. As an example, the first charge signal may also be defined as a potential well charge signal and the second charge signal as an overflow charge signal.

As an example, the photosensitive unit 110 includes at least one photosensitive element PD and a corresponding transmission transistor M1. A control terminal of the transmission transistor M1 receives a first transmission control signal TX1, a first terminal of the transmission transistor M1 is coupled to the transmission node TXN, and a second terminal of the transmission transistor M1 is coupled to a first reference potential via the photosensitive element PD. For example, the second terminal of the transmission transistor M1 is coupled to a first terminal of the photosensitive element PD, and a second terminal of the photosensitive element PD is coupled to the first reference potential.

The photosensitive element PD can be any one of a photodiode, a grating, and a photoconductor, and the transmission transistor M1 can be any one of an NMOS transistor and a PMOS transistor. As an example, the photosensitive element PD is a photodiode, and it can be a PIN photodiode; the transmission transistor M1 is an NMOS transistor; at this time, the gate of the transmission transistor M1 receives the first transmission control signal TX1, the drain of the transmission transistor M1 is connected to the transmission node TXN, the source of the transmission transistor M1 is connected to the first terminal of the photosensitive element PD (such as its N-type ion doped region), and the second terminal of the photosensitive element PD (such as its P-type ion doped region) is connected to the first reference potential.

In practical applications, the number of photosensitive elements PD and transmission transistors M1 included in the photosensitive unit 110 can be adjusted as needed. For example, there can be only one photosensitive element PD, or two, four, eight, or more photosensitive elements PD form a shared structure. In addition, the first reference potential is generally a reference ground potential; in some embodiments, the first reference potential may also be a negative potential.

The overflow unit 120 is coupled to the transmission node TXN for storing the second charge signal when the amount of charge sensed by the photosensitive unit 110 reaches the overflow state. It should be noted that when the amount of charge sensed by the photosensitive unit 110 does not reach the overflow state, the photosensitive unit 110 converts the optical signals into only the first charge signal, at which time no second charge signal is stored in the overflow unit 120.

As an example, a ratio of a charge storage capacity associated with the overflow unit 120 to a charge storage capacity associated with the transmission node TXN is in the range of (10-50):(0.01-0.5). Alternatively, the ratio of the charge storage capacity associated with the overflow unit 120 to the charge storage capacity associated with the transmission node TXN is in the range of (20-22):(0.08-0.10). For example, 45:0.15, 40:0.1, 30:1.5, 22:0.09, 21:0.08, or 15:0.05.

The charge storage capacity associated with the transmission node TXN is designed to be very small, and after the overflow occurs, even if no extra reset operation is performed on the transmission node TXN, the amount of charge stored in it will be smaller after the subsequent quantization phase where the charge is averaged between the floating diffusion node FD and the transmission node TXN. This small amount of charge has almost no effect on the potential of the floating diffusion node FD, and as a result the voltage drop of the floating diffusion node FD can be within 5%, thereby reducing the risk of black sun.

As an example, the overflow unit 120 includes an overflow transistor M2 and an overflow capacitor COF, a control terminal of the overflow transistor M2 receives an overflow control signal OF_CTL, a first terminal of the overflow transistor M2 is coupled to the transmission node TXN, and a second terminal of the overflow transistor M2 is coupled to a second reference potential via the overflow capacitor COF.

The overflow transistor M2 may be either an NMOS transistor or a PMOS transistor; in one embodiment, the overflow transistor M2 is an NMOS transistor, at which time, a gate of the overflow transistor M2 receives the overflow control signal OF_CTL, a drain of the overflow transistor M2 is connected to the transmission node TXN, and a source of the overflow transistor M2 is connected to the second reference potential via the overflow capacitor COF.

As an example, the overflow capacitor COF corresponds to a first wiring, and the reset unit 140 corresponds to a second wiring, wherein one plate of the overflow capacitor COF receives the second reference potential via the first wiring, and the other plate of the overflow capacitor COF receives a first power supply potential via the second wiring to achieve a fast reset of the overflow capacitor COF by simultaneously receiving the second reference potential and the first power supply potential. For example, the second reference potential is a reference ground potential, and the first power supply potential is an operating voltage potential VDD. Different wirings provide different reset state signals, which can realize a fast reset of the overflow capacitor based on ground driving forces, conducive to accepting more charge overflow through the overflow capacitor, thereby making the device better adapted to strong light signals and improving image quality.

The transmission control unit 130 is coupled between the transmission node TXN and the floating diffusion node FD to control a conduction status of a transfer path between the transmission node TXN and the floating diffusion node FD.

As an example, the transmission control unit 130 includes a transmission control transistor M3, a control terminal of the transmission control transistor M3 receives a second transmission control signal TX2, a first terminal of the transmission control transistor M3 is coupled to the transmission node TXN, and a second terminal of the transmission control transistor M3 is coupled to the floating diffusion node FD.

The transmission control transistor M3 may be either an NMOS transistor or a PMOS transistor; in one embodiment, the transmission control transistor M3 is an NMOS transistor, at which time, a gate of the transmission control transistor M3 receives the second transmission control signal TX2, a drain of the transmission control transistor M3 is connected to the transmission node TXN, and a source of the transmission control transistor M3 is connected to the floating diffusion node FD.

In the exposure phase, the transmission control transistor M3 is turned off, cutting off the transfer path between the transmission node TXN and the floating diffusion node FD to facilitate the transfer of the second charge signal to the overflow unit 120 via the transmission node TXN; in the quantization phase, the transmission control transistor M3 is turned on, establishing the transfer path between the transmission node TXN and the floating diffusion node FD, so that the first charge signal and the second charge signal are read out based on the floating diffusion node FD; for example, the first charge signal and the second charge signal are transferred to the floating diffusion node FD via the transmission node TXN for quantitative readout.

The reset unit 140 is coupled to the floating diffusion node FD for resetting the transmission node TXN and the floating diffusion node FD.

As an example, the reset unit 140 includes a reset transistor M4, which has a control terminal receiving a reset control signal RST, a first terminal coupled to the first power supply potential, and a second terminal coupled to the floating diffusion node FD.

The reset transistor M4 may be either an NMOS transistor or a PMOS transistor; in one embodiment, the reset transistor M4 is an NMOS transistor, at which time, a gate of the reset transistor M4 receives the reset control signal RST, a drain of the reset transistor M4 is connected to the first power supply potential, and a source of the reset transistor M4 is connected to the floating diffusion node FD. In practical applications, the first power supply potential is generally the operating voltage potential, which is always high. In some embodiments, the first power supply potential may be variable according to configuration of the select transistors.

The readout unit 150 is coupled to the floating diffusion node FD for reading at least the first charge signal and the second charge signal.

As an example, the readout unit 150 includes a source follower transistor M5 and a select transistor M6, a control terminal of the source follower transistor M5 is coupled to the floating diffusion node FD, a first terminal of the source follower transistor M5 is coupled to a second power supply potential, a second terminal of the source follower transistor M5 is coupled to a first terminal of the select transistor M6, a control terminal of the select transistor M6 receives a select control signal SEL, and a second terminal of the select transistor M6 is coupled to a bit line BL.

The source follower transistor M5 may be either an NMOS transistor or a PMOS transistor, and the select transistor M6 may be either an NMOS transistor or a PMOS transistor. In one embodiment, the source follower transistor M5 and the select transistor M6 are both NMOS transistors, at which time, a gate of the source follower transistor M5 is connected to the floating diffusion node FD, a drain of the source follower transistor M5 is connected to the second power supply potential, a source of the source follower transistor M5 is connected to a drain of the select transistor M6, a gate of the select transistor M6 receives the select control signal SEL, and a source of the select transistor M6 is connected to the bit line BL. In practical applications, the second power supply potential is generally the same as the first power supply potential, which is the operating voltage potential, for example, always high.

Figure 2:
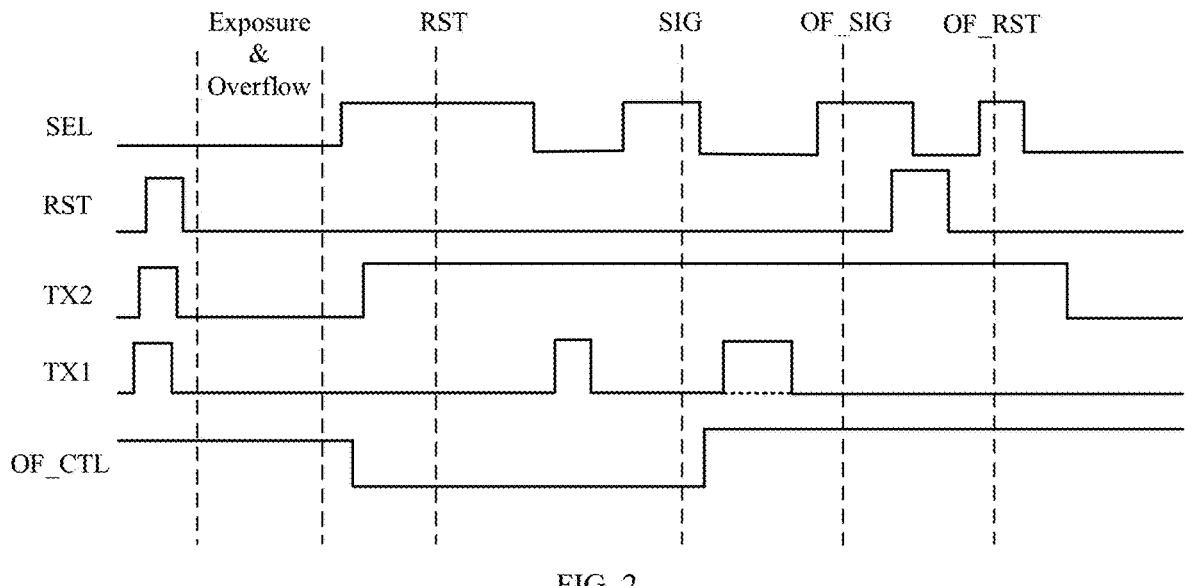
FIG. 2 is a timing diagram corresponding to a control method of the image sensor according to Embodiment 1.

Accordingly, as shown in FIG. 2, the present disclosure also provides a control method for an image sensor, and the control method includes a reset phase and an exposure phase. Further, the control method includes a quantification phase. The image sensor may be implemented using the structures described in previous embodiments.

Reset phase: performing a first reset operation on the transmission node TXN, the floating diffusion node FD, and the photosensitive element PD.

Specifically, the transmission transistor M1 in the photosensitive unit 110, the overflow transistor M2 in the overflow unit 120, and the transmission control transistor M3 in the transmission control unit 130 are controlled to be turned on, and the reset transistor M4 in the reset unit 140 is also controlled to be turned on, and signal reset is achieved by clearing charge on the transmission node TXN, the floating diffusion node FD, and the photosensitive element PD, thus completing the first reset operation; after that, the transmission transistor M1, the transmission control transistor M3, and the reset transistor M4 are turned off.

Exposure phase: turning on the overflow unit 120, and disconnecting the transfer path between the transmission node TXN and the floating diffusion node FD through the transmission control unit 130, so that the second charge signal is transferred to the overflow unit 120 via the transmission node TXN.

Specifically, in the exposure phase, the overflow transistor M2 in the overflow unit 120 is turned on, and the transmission control transistor M3 in the transmission control unit 130 is turned off to cut off the transfer path between the transmission node TXN and the floating diffusion node FD, so that when the amount of charge sensed by the photosensitive unit 110 reaches the overflow state, the second charge signal can be transferred and stored into the overflow capacitor COF via the transmission node TXN without passing through the floating diffusion node FD.

When the amount of charge sensed by the photosensitive unit 110 does not reach the overflow state, the photosensitive unit 110 converts the optical signals into only the first charge signal, which is stored in the photosensitive element PD in the photosensitive unit 110. At this time, although the overflow transistor M2 is turned on, no second charge signal is transferred through the transmission node TXN and stored in the overflow capacitor COF, and the corresponding second charge signal in the process can be considered to be zero.

When the amount of charge sensed by the photosensitive unit 110 reaches the overflow state, the photosensitive unit 110 converts the optical signals into the first charge signal and the second charge signal, wherein the first charge signal is stored in the photosensitive element PD in the photosensitive unit 110, and the second charge signal is transferred via the transmission node TXN and stored in the overflow capacitor COF.

Quantization phase: turning off the overflow unit 120 and connecting the transfer path between the transmission node TXN and the floating diffusion node FD through the transmission control unit 130 to perform quantitative readout of the first charge signal based on the floating diffusion node FD; and turning on the overflow unit 120 to perform quantitative readout of the second charge signal based on the transmission node TXN and the floating diffusion node FD. It should be noted that when the amount of charge sensed by the photosensitive unit 110 does not reach the overflow state, at this phase quantitative readout of the second charge signal after the overflow unit 120 is turned on is zero.

Further, before quantitative readout of the first charge signal, in this phase quantitative readout of the first reset signal based on the floating diffusion node FD is also performed to achieve correlated double sampling of the first charge signal; after quantitative readout of the second charge signal, in this phase, a second reset operation is also performed on the transmission node TXN and the floating diffusion node FD to achieve quantitative readout of the second reset signal based on the floating diffusion node FD, so as to achieve non-real correlated double sampling of the second charge signal.

As an example, in the quantization phase, the reading of the first charge signal and the first reset signal precedes the reading of the second charge signal and the second reset signal, wherein the first reset signal is read before the first charge signal, and the second charge signal is read before the second reset signal, so as to perform quantitative readout based on the floating diffusion node FD. As an example, after the exposure phase ends and the quantization phase begins, the transmission control transistor M3 in the transmission control unit 130 is turned on and the transmission control transistor M3 remains turned on throughout the quantization process.

For the first reset signal and the first charge signal:
the overflow transistor M2 in the overflow unit 120 is controlled to be turned off and the transmission control transistor M3 in the transmission control unit 130 is controlled to be turned on, so as to perform quantitative readout of the first reset signal (i.e., RST) based on the floating diffusion node FD;
as an example, in the quantization phase, the select transistor M6 in the readout unit 150 is first controlled to be turned on, and then the overflow transistor M2 is controlled to be turned off and the transmission control transistor M3 is controlled to be turned on; alternatively, the overflow transistor M2 is first turned off and then the transmission control transistor M3 is turned on; alternatively, the turning off of the overflow transistor M2 and the turning on of the transmission control transistor M3 occur simultaneously.

Then, the transmission transistor M1 in the photosensitive unit 110 is controlled to be first turned on and then off, so that the first charge signal (i.e., SIG) stored in the photosensitive element PD is transferred to the floating diffusion node FD via the transmission node TXN for quantitative readout.

As an example, how the select transistor M6 is turned on after being turned off is controlled based on how the transmission transistor M1 is first turned on and then off. As a further example, an off-interval of the selector transistor M6 is controlled to include an on-interval of the transmission transistor M1. See FIG. 2 where the high-level intervals of the transmission transistor M1 and the low-level intervals of the select transistor M6 correspond to each other for the first time in the quantization phase.

For the second charge signal and the second reset signal:

The overflow transistor M2 in the overflow unit 120 is controlled to be turned on, so that the second charge signal (i.e., OF_SIG) stored in the overflow capacitor COF is transferred to the floating diffusion node FD via the transmission node TXN for quantitative readout.

As an example, when performing quantitative readout of the second charge signal, the transmission transistor M1 in the photosensitive unit 110 is controlled to be first turned on and then turned off while the select transistor M6 in the readout unit 150 is controlled to be first turned off and then turned on. As a further example, the transmission transistor M1 is controlled to be first turned on and then turned off, after the overflow transistor M2 in the overflow unit 120 is controlled to be turned on. As a further example, off-intervals of the selector transistor M6 are controlled to include on-intervals of the transmission transistor M1. See FIG. 2 where the high-level intervals of the transmission transistor M1 and the low-level intervals of the select transistor M6 correspond to each other for the second time in the quantization phase.

Then, the reset transistor M4 in the reset unit 140 is turned on and then off, to perform a reset operation on the transmission node TXN and the floating diffusion node FD to achieve quantitative readout of the second reset signal (i.e., OF_RST) based on the floating diffusion node FD.

As an example, how the reset transistor M4 is turned on and then turned off corresponds to how the select transistor M6 in the readout unit 150 is turned off and then turned on. In a further example, each time the reset transistor M4 is turned off, the select transistor M6 is in one of its off-intervals; further, as an example, turning on of the reset transistor M4 precedes turning off of the select transistor M6, and turning off of the reset transistor M4 precedes turning on of the select transistor M6. For specific operations, see how the second reset signal (OF_RST) is obtained as shown in FIG. 2.

Figure 3:
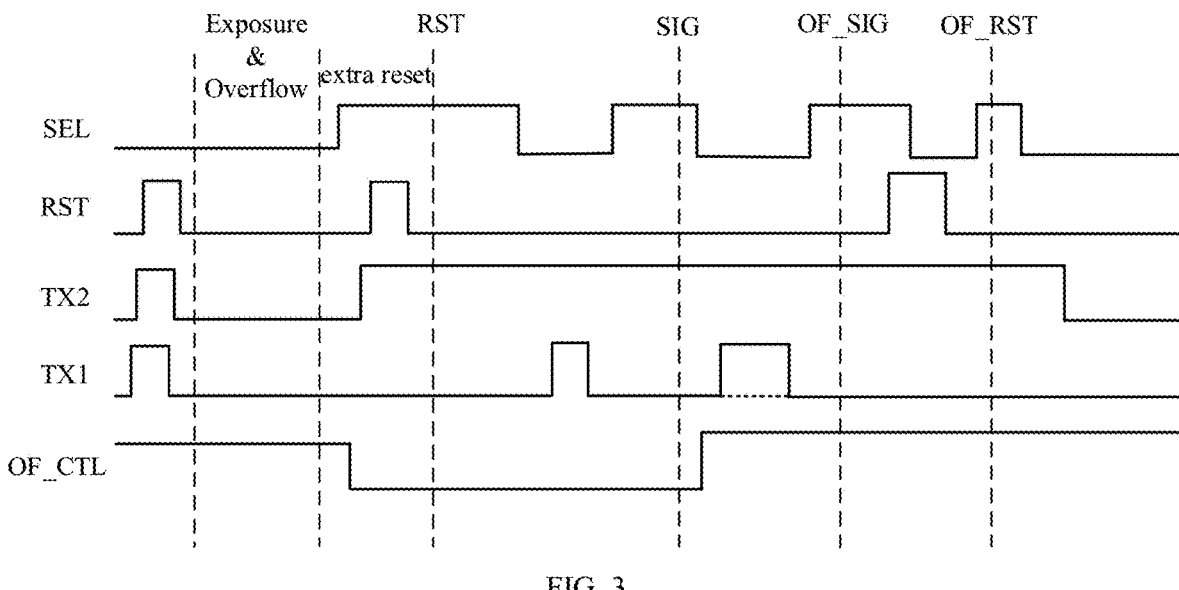
FIG. 3 is another timing diagram corresponding to the control method of the image sensor according to Embodiment 1.

As another example, as shown in FIG. 3, before quantitative readout of signals in the exposure phase, an extra reset operation is performed on the transmission node TXN and the floating diffusion node FD to clear part of the charge stored in the transmission node TXN during the overflow process to avoid the influence of this part of the charge on the floating diffusion node FD's potential during subsequent quantitative readout, avoiding black sun; although clearing this part of the charge will affect the subsequent quantitative readout of the second charge signal, the amount of charge stored in the transmission node TXN is small, and therefore it has minimal impact on the accuracy of the signal.

Specifically, the overflow transistor M2 in the overflow unit 120 is turned off, the transmission control transistor M3 in the transmission control unit 130 is turned on, the reset transistor M4 in the reset unit 140 is turned on and then turned off, signal reset is achieved by clearing charge on the transmission node TXN and the floating diffusion node FD, completing this extra reset operation.

As an example, first, the select transistor M6 in the readout unit 150 is controlled to be turned on; then, the overflow transistor M2 is turned off and the transmission control transistor M3 is turned on, after the select transistor M6 is turned on; optionally, the overflow transistor M2 is first turned off and then the transmission control transistor M3 is turned on. Finally, after the overflow transistor M2 is turned off and the transmission control transistor M3 is turned on, the above-described extra reset operation is performed, which may include, for example, first turning on and then turning off the reset transistor M4 for once.

Figure 4:
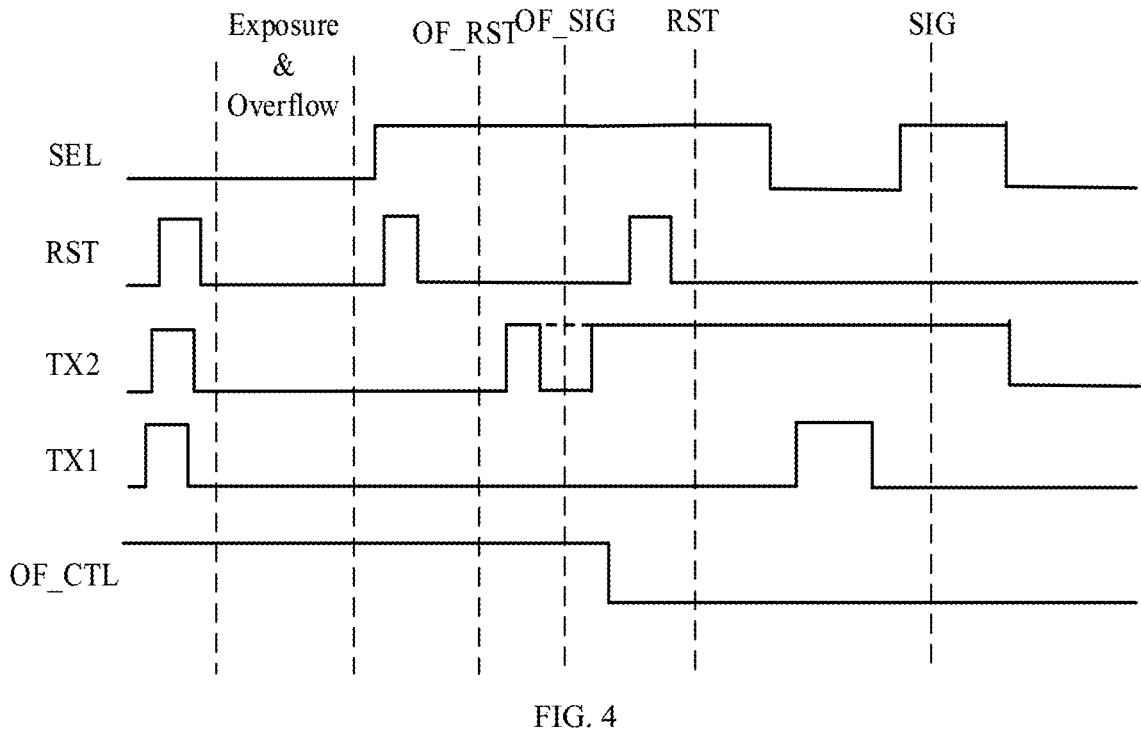
FIG. 4 is another timing diagram corresponding to the control method of the image sensor according to Embodiment 1.

As another example, as shown in FIG. 4, the reading of the second charge signal and the second reset signal precedes the reading of the first charge signal and the first reset signal, and specifically the second reset signal is read before the second charge signal, and the first reset signal is read before the first charge signal, achieving quantitative readout based on the floating diffusion node FD.

In this case, after the exposure phase, the overflow transistor M2 initially remains turned on to read out the second charge signal: specifically, when the transmission control transistor M3 is off, the second reset signal (i.e., OF_RST) is obtained by resetting via the reset transistor M4; then, the transmission control transistor M3 is turned on and then off, to obtain the potential of the second charge signal corresponding to the overflow unit, thereby obtaining the second charge signal (i.e., OF_SIG), and realizing the real correlated double sampling of the overflow signal. Later, the overflow transistor M2 is turned off and the transmission control transistor M3 is turned on to obtain the first reset signal (i.e., RST) and the first charge signal (i.e., SIG).

Specifically, the second charge signal (i.e., OF_SIG) can also be read with the transmission control transistor M3 turned on, as shown by the horizontal dotted line in FIG. 4; but it is preferable that the second charge signal is read with the transmission control transistor M3 turned off, which is conducive to keeping the reset signal acquisition state consistent with the charge signal acquisition state. For details of the other features of examples corresponding to FIG. 4, reference can be made to FIGS. 1-3 and accompanying descriptions.

Embodiment 2

Figure 5:
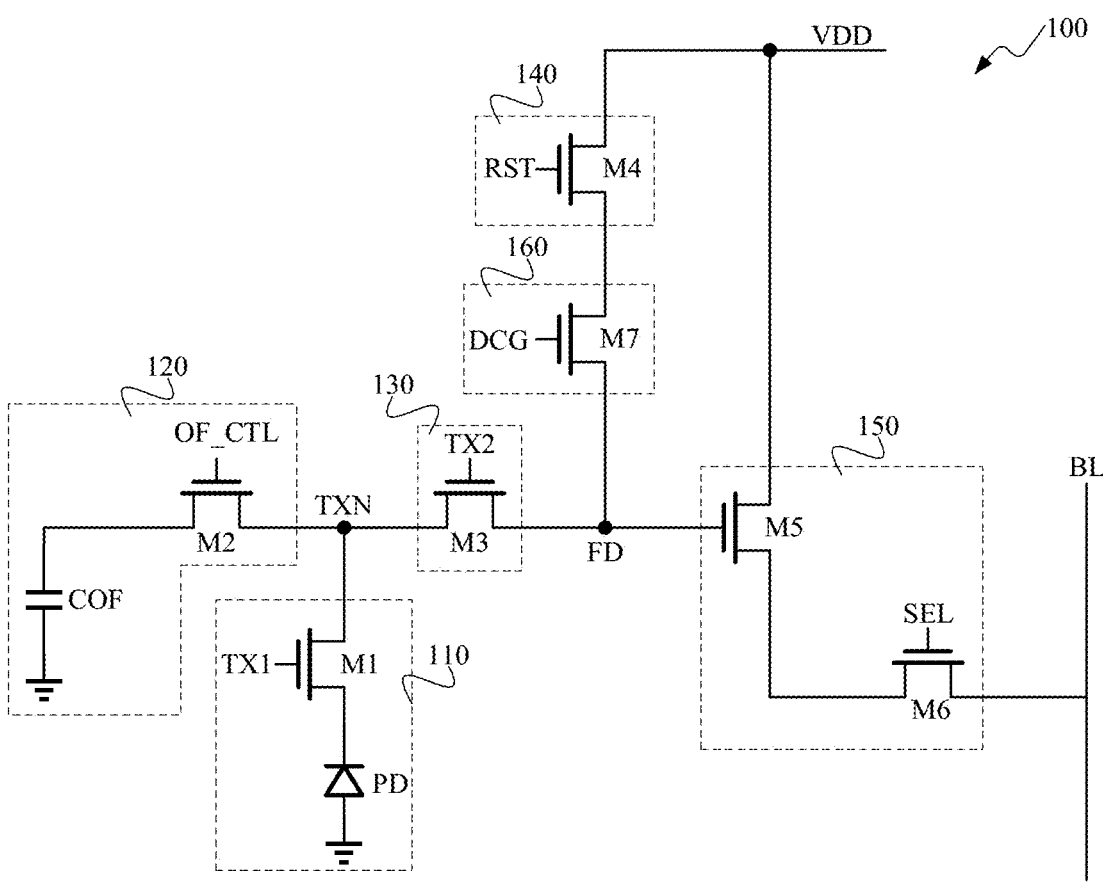
FIG. 5 is a schematic structural diagram of an image sensor according to Embodiment 2.

As shown in FIG. 5, compared to the image sensor described in Embodiment 1, each pixel block 100 of the image sensor of Embodiment 2 further includes a gain unit 160. Detailed descriptions of relevant structures and operations of the image sensor can be found in Embodiment 1.

The gain unit 160 is coupled between the reset unit 140 and the floating diffusion node FD for switching between different conversion gains.

As an example, the gain unit 160 includes a gain transistor M7, a control terminal of the gain transistor M7 receives a gain control signal DCG, a first terminal of the gain transistor M7 is coupled to the reset unit 140, and a second terminal of the gain transistor M7 is coupled to the floating diffusion node FD.

The gain transistor M7 may be either an NMOS transistor or a PMOS transistor. Hereinafter, the gain transistor M7 is assumed to be an NMOS transistor. At this time, a gate of the gain transistor M7 receives the gain control signal DCG, a drain of the gain transistor M7 is connected to the source of the reset transistor M4, and a source of the gain transistor M7 is connected to the floating diffusion node FD.

When performing conversion gain switching, when the gain transistor M7 is turned on, the image sensor composed of the pixel blocks 100 operates in a low-conversion-gain (LCG) mode, and when the gain transistor M7 is turned off, the image sensor composed of the pixel blocks 100 operates in a high-conversion-gain (HCG) mode.

As an example, a ratio of an LCG charge storage capacity associated with the gain unit 160 to a charge storage capacity associated with the transmission node is in the range of (1-20):(0.01-0.5), and a ratio of an HCG charge storage capacity associated with the gain unit 160 to the charge storage capacity associated with the transmission node is in the range of (0.5-2):(0.01-0.5).

It should be noted that the low-conversion-gain charge storage capacity associated with the gain unit 160 may be considered as the sum of capacitances of relevant nodes corresponding to the operation of the image sensor in the LCG mode (e.g., when the gain transistor M7 is turned on), for example, the sum of the capacitance of the floating diffusion node FD and the capacitance corresponding to the gain unit 160; and similarly, the high-conversion-gain charge storage capacity associated with the gain unit 160 may be considered as the sum of capacitances of relevant nodes corresponding to the operation of the image sensor in the HCG mode (e.g., when the gain transistor M7 is turned off), for example, the capacitance of the floating diffusion node FD.

As an alternative, the ratio of the LCG charge storage capacity associated with the gain unit 160 to the charge storage capacity associated with the transmission node is in the range of (5-10):(0.1-0.2). For example, 8:0.15, 5:0.12, 4:0.1, 3:0.08, or 2:0.05.

The ratio of the HCG charge storage capacity associated with the gain unit 160 to the charge storage capacity associated with the transmission node is in the range of (0.8-1.5):(0.1-0.2). For example, 1.6:0.15, 1.2:0.12, 0.8:0.1, 0.6:0.08, or 0.5:0.05.

As an example, according to the above-described ratios, absolute values of specific charge storage capacities can be configured in units of femtofarads. For example, when the ratio of the HCG charge storage capacity associated with the gain unit 160 to the charge storage capacity associated with the transmission node TXN is 0.8:0.1 or 0.5:0.05, the HCG charge storage capacity associated with the gain unit 160 may be set to be 0.8 femtofarads, for example, and then the charge storage capacity associated with the transmission node TXN may be 0.1 femtofarads; or the high-conversion-gain charge storage capacity associated with the gain unit 160 may be set to be 0.5 femtofarads, for example, and then the charge storage capacity associated with the transmission node TXN may be 0.05 femtofarads, etc.

Figure 6:
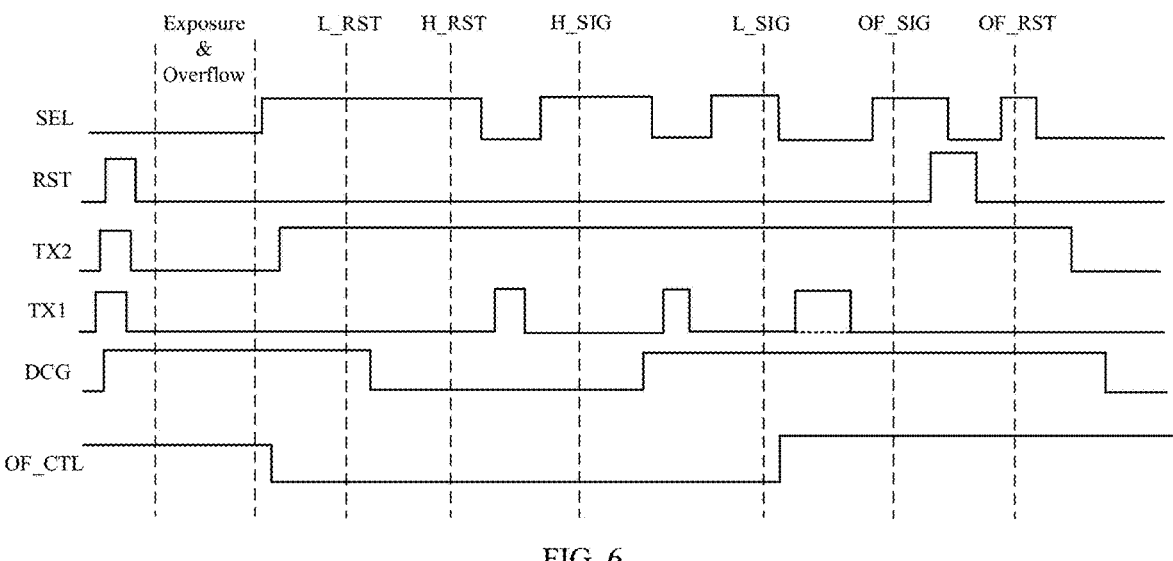
FIG. 6 is a timing diagram corresponding to a control method of the image sensor according to Embodiment 2.

Accordingly, as shown in FIG. 6, the present disclosure also provides a control method for an image sensor, and the control method includes a reset phase and an exposure phase. Further, the control method includes a quantification phase. The image sensor may be implemented using the structures described in previous embodiments.

Reset phase: performing reset operations on the transmission node TXN, the floating diffusion node FD, and the photosensitive element PD.

Specifically, the transmission transistor M1 in the photosensitive unit 110, the overflow transistor M2 in the overflow unit 120, the transmission control transistor M3 in the transmission control unit 130, and the gain transistor M7 in the gain unit 160 are controlled to be turned on, and the reset transistor M4 in the reset unit 140 is also controlled to be turned on, and signal reset is achieved by clearing charge on the transmission node TXN, the floating diffusion node FD, and the photosensitive element PD, completing a first reset operation; after that, the transmission transistor M1, the transmission control transistor M3, and the reset transistor M4 are turned off.

Exposure phase: turning on the overflow unit 120, and disconnecting the transfer path between the transmission node TXN and the floating diffusion node FD through the transmission control unit 130, so that the second charge signal is transferred to the overflow unit 120 via the transmission node TXN.

Specifically, in the exposure phase, the overflow transistor M2 in the overflow unit 120 is turned on, and the transmission control transistor M3 in the transmission control unit 130 is turned off to cut off the transfer path between the transmission node TXN and the floating diffusion node FD, so that when the amount of charge sensed by the photosensitive unit 110 reaches the overflow state, the second charge signal can be transferred and stored into the overflow capacitor COF via the transmission node TXN without passing through the floating diffusion node FD.

When the amount of charge sensed by the photosensitive unit 110 does not reach the overflow state, the photosensitive unit 110 converts the optical signals into only the first charge signal, which is stored in the photosensitive element PD in the photosensitive unit 110. At this time, although the overflow transistor M2 is turned on, no second charge signal is transferred through the transmission node TXN and stored in the overflow capacitor COF.

When the amount of charge sensed by the photosensitive unit 110 reaches the overflow state, the photosensitive unit 110 converts the optical signals into the first charge signal and the second charge signal, wherein the first charge signal is stored in the photosensitive element PD in the photosensitive unit 110, and the second charge signal is transferred via the transmission node TXN and stored in the overflow capacitor COF.

As an example, in the exposure phase, the gain transistor M7 remains turned on; preferably, the gain transistor M7 is not turned off after the first reset operation and remains turned on throughout the entire exposure phase, which is conducive to reducing noise.

Quantization phase: turning off the overflow unit 120 and connecting the transfer path between the transmission node TXN and the floating diffusion node FD through the transmission control unit 130, and controlling the gain unit 160 to be turned off and turned on to perform quantitative readout of the first charge signal based on the floating diffusion node FD under different conversion gains; and turning on the overflow unit 120 to perform quantitative readout of the second charge signal based on the transmission node TXN and the floating diffusion node FD.

It should be noted that when the amount of charge sensed by the photosensitive unit 110 does not reach the overflow state, at this phase, quantitative readout of the second charge signal after the overflow unit 120 is turned on is zero.

Further, before quantitative readout of the first charge signal under different conversion gains, in this the phase, the gain unit 160 is also controlled to be turned on and off to perform quantitative readout of the first reset signal under different conversion gains based on the floating diffusion node FD, to achieve correlated double sampling of the first charge signal under different conversion gains.

After quantitative readout of the second charge signal, in this phase, a second reset operation is also performed on the transmission node TXN and the floating diffusion node FD to achieve quantitative readout of the second reset signal based on the floating diffusion node FD, so as to achieve non-real correlated double sampling of the second charge signal.

As an example, in the quantization phase, the reading of the first charge signal and the first reset signal precedes the reading of the second charge signal and the second reset signal, wherein the first reset signal is read before the first charge signal, and the second charge signal is read before the second reset signal, so as to perform quantitative readout based on the floating diffusion node FD.

For the first reset signal and the first charge signal:

the overflow transistor M2 in the overflow unit 120 is controlled to be turned off, the transmission control transistor M3 in the transmission control unit 130 is controlled to be turned on, and since the gain transistor M7 in the gain unit 160 is turned on, the image sensor operates in the LCG mode and performs quantitative readout of a LCG first reset signal (L_RST) based on the floating diffusion node FD;

then, the gain transistor M7 in the gain unit 160 is controlled to be turned off, and the image sensor switches to the HCG mode and performs quantitative readout of an HCG first reset signal (H_RST) based on the transmission node TXN and the floating diffusion node FD;

later, the transmission transistor M1 in the photosensitive unit 110 is controlled to be turned on and off, and performs quantitative readout of an HCG first charge signal (H_SIG) based on the transmission node TXN and the floating diffusion node FD;

finally, the gain transistor M7 in the gain unit 160 is controlled to be turned on, the image sensor switches to the LCG mode, the transmission transistor M1 in the photosensitive unit 110 is controlled to be turned on and off and performs quantitative readout of a LCG first charge signal (L_SIG) based on the transmission node TXN and the floating diffusion node FD.

In one example, in the transfer processes of the HCG first charge signal and the LCG first charge signal, the transmission transistor M1 is turned on and then off. In a further example, in the above transfer processes, the select transistor M6 is turned off. For details, refer to the transfer processes when the transmission transistor M1 is turned on for the first two times in the quantization phase, as shown in FIG. 6.

For the second charge signal and the second reset signal:

The overflow transistor M2 in the overflow unit 120 is controlled to be turned on, so that the second charge signal (i.e., OF_SIG) stored in the overflow capacitor COF is transferred to the floating diffusion node FD via the transmission node TXN for quantitative readout; then, the reset transistor M4 in the reset unit 140 is turned on and then off, to perform a reset operation on the transmission node TXN and the floating diffusion node FD to achieve quantitative readout of the second reset signal (i.e., OF_RST) based on the floating diffusion node FD.

Of course, during quantitative readout of the second charge signal, the transmission transistor M1 in the photosensitive unit 110 can also be controlled to be turned on and then off.

Figure 7:
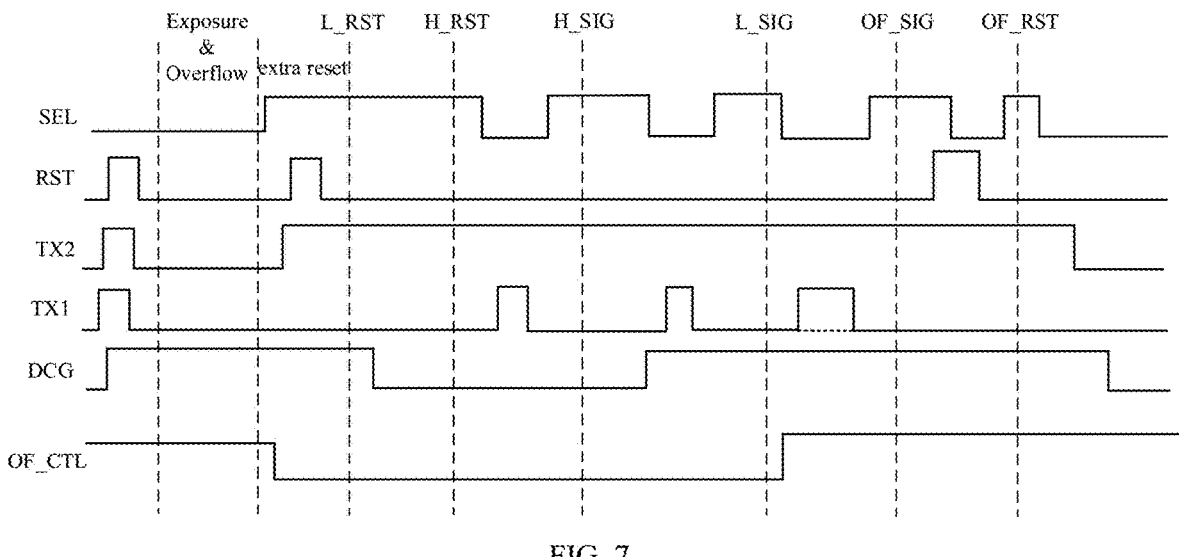
FIG. 7 is another timing diagram corresponding to the control method of the image sensor according to Embodiment 2.

As another example, as shown in FIG. 7, before quantitative readout of signals in the exposure phase, an extra reset operation is performed on the transmission node TXN and the floating diffusion node FD to clear part of the charge stored in the transmission node TXN during the overflow process to avoid the influence of this part of the charge on the floating diffusion node FD's potential during subsequent quantitative readout, avoiding black sun; although clearing this part of the charge will affect the subsequent quantitative readout of the second charge signal, the amount of charge stored in the transmission node TXN is small, and therefore it has minimal impact on the accuracy of the second charge signal.

Specifically, the overflow transistor M2 in the overflow unit 120 is turned off, and the transmission control transistor M3 in the transmission control unit 130 is turned on. In a further example, the gain transistor M7 is also kept turned on since the first reset operation, at which time the reset transistor M4 in the reset unit 140 is turned on and then turned off, and signal reset is achieved by clearing charge on the transmission node TXN and the floating diffusion node FD, completing this extra reset operation.

Figure 8:
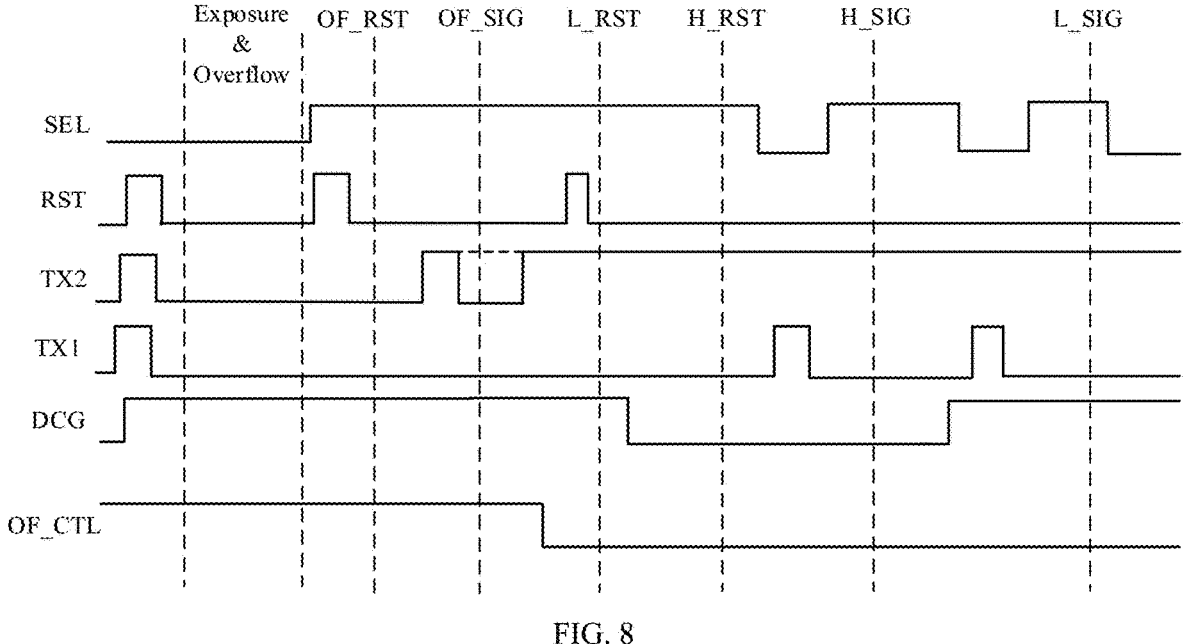
FIG. 8 is another timing diagram corresponding to the control method of the image sensor according to Embodiment 2.

As another example, as shown in FIG. 8, the reading of the second charge signal and the second reset signal precedes the reading of the first charge signal and the first reset signal, and specifically the second reset signal is read before the second charge signal, and the first reset signal is read before the first charge signal, achieving quantitative readout based on the floating diffusion node FD.

In this case, after the exposure phase, the overflow transistor M2 initially remains turned on to read out the second charge signal: specifically, when the transmission control transistor M3 is off, the second reset signal (i.e., OF_RST) is obtained by resetting via the reset transistor M4; then, the transmission control transistor M3 is turned on and then off, to obtain the potential of the second charge signal corresponding to the overflow unit, thereby obtaining the second charge signal (i.e., OF_SIG), and realizing the real correlated double sampling of the overflow signal; later, the overflow transistor M2 is turned off and the transmission control transistor M3 is turned on, to obtain the first reset signals and first charge signals, including a LCG first reset signal (L_RST), a HCG first reset signal (H_RST), a HCG first charge signal (H_SIG), and a LCG first charge signal (L_SIG).

Specifically, the second charge signal (OF_SIG) can also be read with the transmission control transistor M3 turned on, as shown by the horizontal dotted line in FIG. 8; but it is preferable that the second charge signal is read with the transmission control transistor M3 turned off, which is conducive to keeping the reset signal acquisition state consistent with the charge signal acquisition state. For details of the other features of examples corresponding to FIG. 8, reference can be made to previous descriptions.

Figure 9:
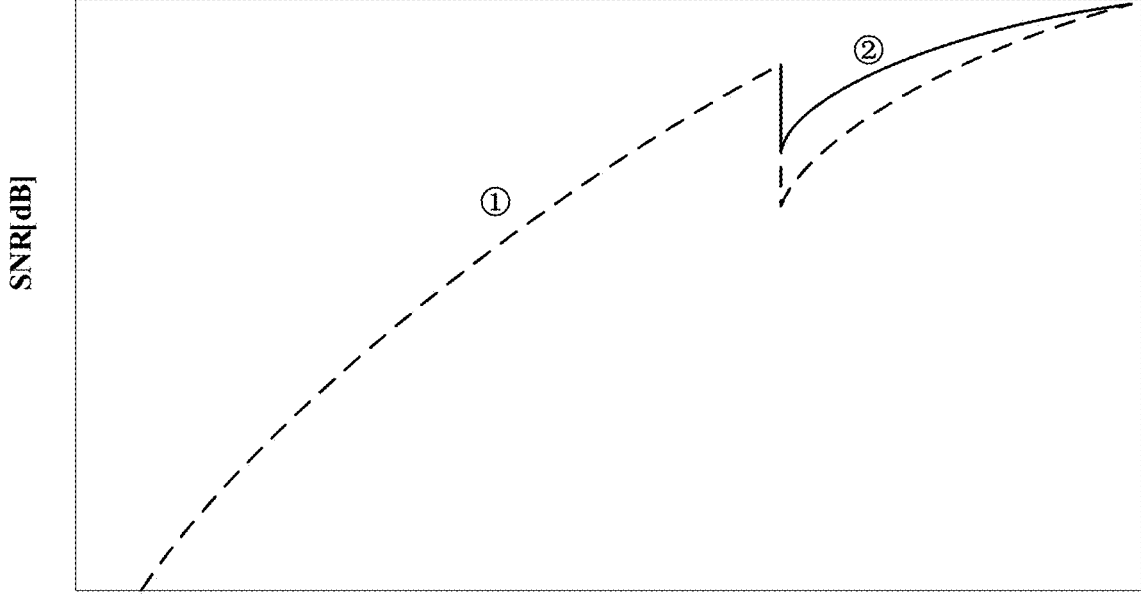
FIG. 9 shows two signal-to-noise ratio curves of the image sensor according to Embodiment 2, wherein the two curves represent scenarios where the image sensor either includes or does not include a transmission control unit.

The image sensor of this embodiment was subjected to testing under two distinct conditions: one without a transmission control unit (i.e., in the absence of the transmission control transistor M3), and the other with a transmission control unit (i.e., in the presence of the transmission control transistor M3). The corresponding signal-to-noise ratio curves derived from these tests are depicted in FIG. 9. Specifically, Curve 1 corresponds to the signal-to-noise ratio curve obtained in the absence of a transmission control unit, while Curve 2 corresponds to the signal-to-noise ratio curve obtained in the presence of a transmission control unit. It can be seen from FIG. 9 that when the transmission control unit is included, the signal-to-noise ratio curve is smoother and the signal connection is better, which is more conducive to the overall improvement of the signal-to-noise ratio performance of the image sensor.

In Embodiment 1 and Embodiment 2, the turning off of the transmission transistor M1 before the quantization phase is a partial turning off, to facilitate charge overflow in the exposure phase, while the turning off thereof during the quantization phase is a complete turning off, to facilitate charge transfer, and to avoid the impact of the extra reset operation on the amount of charge in the photosensitive element PD. The turning off of other transistors in each phase is a complete turning off; the turning on of all transistors in each phase is a complete turning on. Through process preparation or sub-threshold state switch control, the transmission transistor M1 can be adjusted to be partially turned on. In this state, it allows for the passage of charge. Specifically, when the charge reaches an overflow state, it can be transferred to the transmission node TXN. This concept should be understood by those skilled in the art.

Embodiment 3

Figure 10:
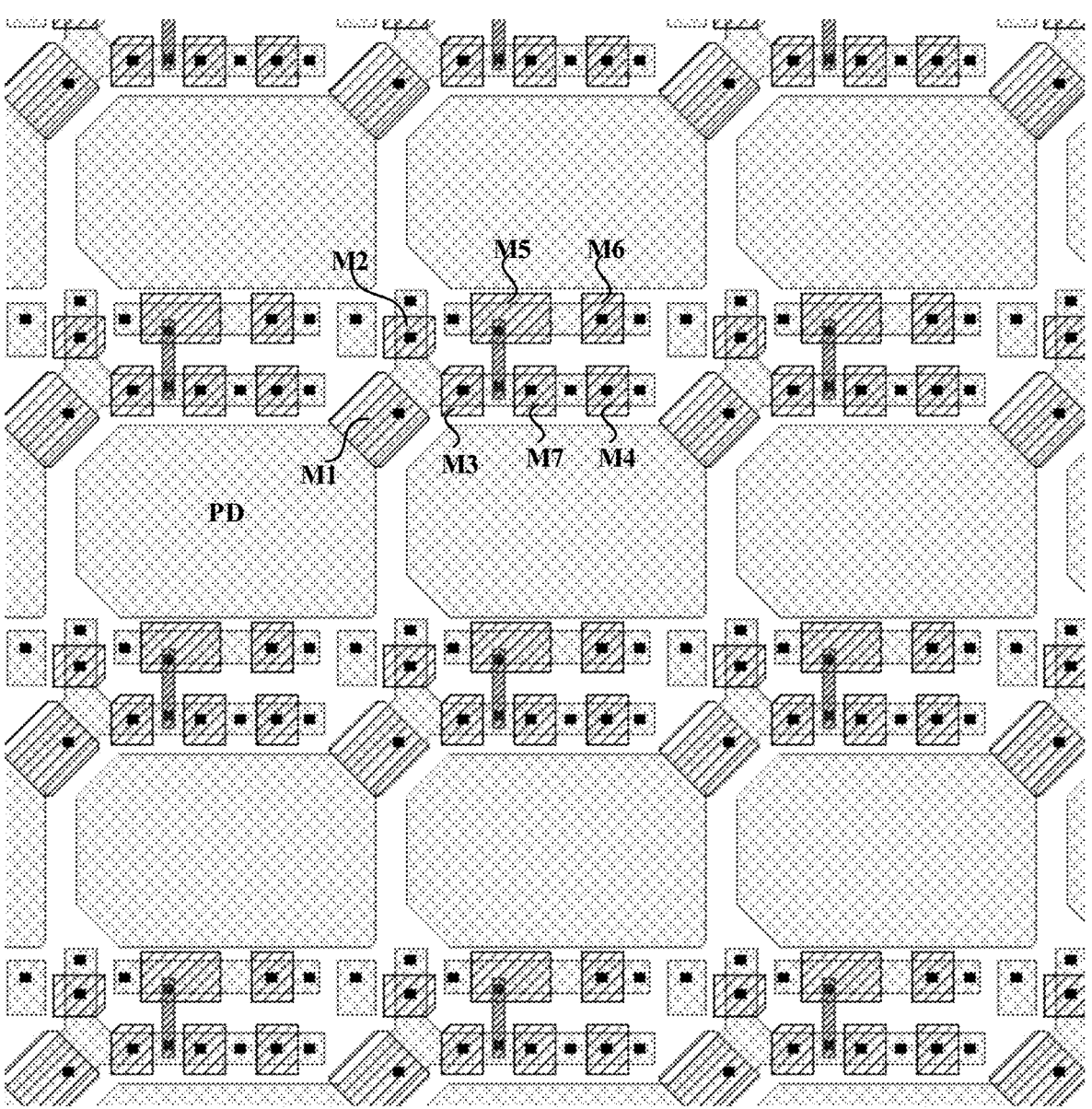
FIG. 10 is a schematic diagram showing a layout of an image sensor according to Embodiment 3.

As shown in FIG. 10, Embodiment 3 provides an image sensor including several pixel blocks 100 arranged in an array, wherein the array includes multiple rows and columns. Each pixel block 100 includes a photosensitive unit 110, an overflow unit 120, a transmission control unit 130, a reset unit 140, and a readout unit 150. Each pixel block 100 may further include a gain unit 160. The photosensitive unit 110 includes one or more photosensitive elements PD and a corresponding transmission transistors M1, the overflow unit 120 includes an overflow transistor M2 and an overflow capacitor COF, the transmission control unit 130 includes a transmission control transistor M3, the reset unit 140 includes a reset transistor M4, the readout unit 150 includes a source follower transistor M5 and a select transistor M6, and the gain unit 160 includes a gain transistor M7; exemplary connections of the above elements are detailed by FIGS. 1 and 5 and accompanying descriptions.

As an example, as shown in FIG. 10, each of the pixel blocks 100 includes a first device area and a second device area, the first device area includes the photosensitive unit 110, and the second device area includes the overflow unit 120, the transmission control unit 130, the reset unit 140, and the readout unit 150; the first device area and the second device area of the same pixel block 100 are spaced apart along a first direction, first device areas of different pixel blocks 100 are spaced apart along a second direction, and second device areas of different pixel blocks 100 are spaced apart along the second direction, and there is a non-zero angle between the first direction and the second direction. In practical applications, the first direction is a row direction (along which a row of pixel blocks are arranged), the second direction is a column direction (along which a column of pixel blocks are arranged), and there is a 90° angle between the two directions.

It should be noted that although the first device area and the second device area of the same pixel block 100 are spaced apart along the first direction, they are also spaced apart in the second direction; although first/second device areas of different pixel blocks 100 are spaced apart in the second direction, they are also spaced apart in the first direction. Only in this way can the device areas be closely arranged, which is conducive to area reduction.

As an alternative, in the second device area, the overflow unit 120 extends in the second direction from the first device area via the transmission node TXN (see arrangement of M2 in FIG. 10), the transmission control unit 130 extends in the first direction from the first device area via the transmission node TXN (see arrangement of M3 in FIG. 10), the readout unit 150 and the transmission control unit 130 are spaced apart in the second direction (see arrangement of M5 and M6 relative to M3 in FIG. 10), and the readout unit 150 and the overflow unit 120 are spaced apart in the first direction (see arrangement of M5 and M6 relative to M2 in FIG. 10). Further, the reset unit 140 and the transmission control unit 130 are spaced apart in the first direction, and the reset unit 140 is further away from the first device area than the transmission control unit 130 is from the first device area (see arrangement of M4 in FIG. 10). Further, when each pixel block 100 also includes the gain unit 160, the gain unit 160 is in the second device area and between the transmission control unit 130 and the reset unit 140 (see arrangement of M7 in FIG. 10). By the above arrangement, the components in each pixel block 100 can be arranged in a more regular manner along both the first direction and the second direction, conducive to metal wiring with straight lines, which is simple and minimizes crosstalk. The overflow capacitor may be a MIM capacitor.

Figure 11:
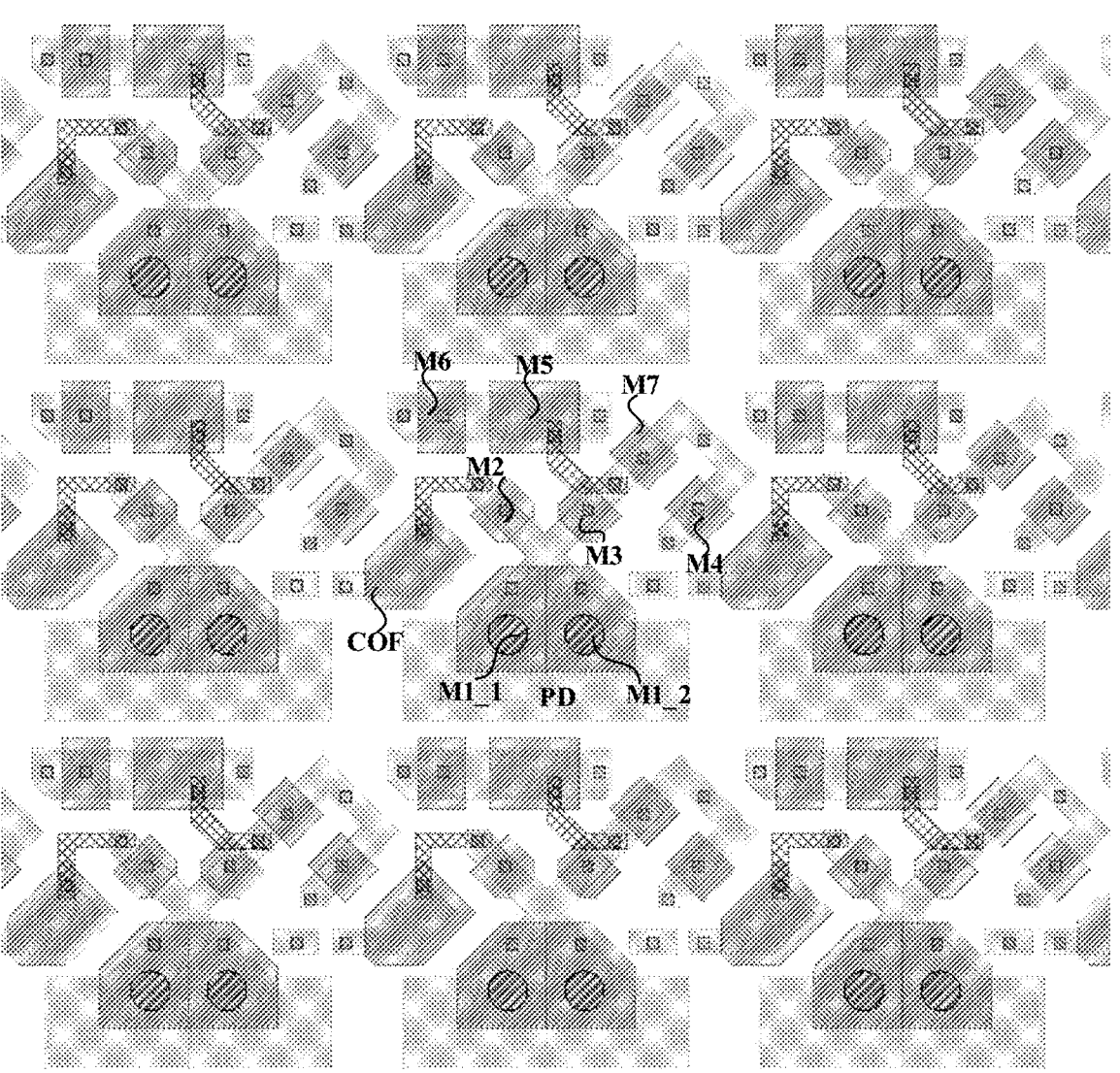
FIG. 11 is a schematic diagram showing another layout of the image sensor according to Embodiment 3.

Alternatively, as shown in FIG. 11, each pixel block 100 includes a third device area and a fourth device area arranged adjacently; the third device area includes the photosensitive unit 110, and the fourth device area includes the overflow unit 120, the transmission control unit 130, the reset unit 140, and the readout unit 150; the overflow unit 120 and the transmission control unit 130 extend from the third device area and are symmetrically arranged on two sides of a first central axis of the fourth device area.

Optionally, the overflow unit 120 extends in a third direction having a first angle with the row direction (see arrangement of M2 in FIG. 11), the transmission control unit 130 extends in a fourth direction having a second angle with the row direction (see arrangement of M3 in FIG. 11), and the readout unit 150 extends in the row direction. As an example, the readout unit 150 is further away from the third device area than the overflow unit 120 and the transmission control unit 130 are from the third device area, and corresponds to the first central axis (see arrangement of M5 and M6 in FIG. 11). Further, when each pixel block 100 also includes the gain unit 160, the gain unit 160 extends from the transmission control unit 130 in the fourth direction (see arrangement of M7 in FIG. 11), and the reset unit 140 extends in the fourth direction and is spaced apart from the gain unit 160 (see arrangement of M4 in FIG. 11). By the above arrangement, components in each pixel block 100 can be arranged on two sides of the first central axis in an approximately symmetrical manner, which is conducive to minimizing the impact of parasitic parameters.

In addition, the third device area has a second central axis, and the photosensitive unit 110 includes a first sub-transmission element and a second sub-transmission element symmetrically distributed on two sides of the second central axis (see arrangement of M1_1 and M1_2 in FIG. 11); each sub-transmission element of the photosensitive unit 110 includes a vertical transfer gate and the pixel block 100 includes square structures.

Still referring to FIG. 11, as an example, the photosensitive unit includes a first sub-photosensitive element and a second sub-photosensitive element (e.g., each corresponding to a sub-transmission element) disposed in left and right portions of the third device area, respectively, and the overflow unit (see arrangement of M2 and COF) and the reset unit (see arrangement of M4) are disposed in left and right portions of the fourth device area, respectively, so as to achieve overflow signal acquisition based on the first sub-photosensitive element, and conversion signal acquisition based on the second sub-photosensitive element. As an example, the left-right direction corresponds to the row direction. The first sub-photosensitive element and the second sub-photosensitive element correspond to the first sub-transmission element and the second sub-transmission element, respectively (see arrangement of M1_1 and M1_2 in FIG. 11). The photosensitive element PD can be divided into the first sub-photosensitive element and the second sub-photosensitive element using existing methods. Preferably, the first sub-photosensitive element and the second sub-photosensitive element are arranged symmetrically with respect to the second central axis. Further, the first sub-photosensitive element may include a transmission-reducing structure. In addition, the transmission control unit (see M3 in FIG. 11) and the gain unit (see M7 in FIG. 11) are closer to the second sub-photosensitive element than to the first sub-sensitive element. In this embodiment, low-sensitivity sensing can be achieved by the first sub-photosensitive element, and collection of any overflow signal can be achieved by the overflow unit, which is configured to obtain high-brightness signals or LED flashing signals; high-sensitivity sensing can be achieved by the second sub-photosensitive element, and the second sub-photosensitive element can further be a gain control unit to obtain its own conversion signal, obtaining low-brightness signals; this design improves the overall image quality.

In the examples described above, memory elements of the gain unit 160 are at least arranged in the substrate, and may include one or more of MOS capacitors, and MIM capacitors.

The presently disclosed image sensor and control method thereof introduce a transmission node in addition to the existing floating diffusion node, managed by the transmission control unit. The transmission node has a minimal charge storage capacity and therefore even in the event of charge overflow, its influence on the floating diffusion node's potential during quantitative readout is negligible, which significantly reduces the likelihood of black sun. If the charge stored by the transmission node is cleared before the quantitative readout to avoid black sun, the cleared charge will also have a minimal effect on the accuracy of the overflow charge's quantitative readout. This ensures the precision of the sensor's performance. Therefore, the present disclosure effectively overcomes various shortcomings in the existing technology and has high industrial utilization value.

The above-mentioned embodiments are merely illustrative of the principle and effects of the present disclosure instead of restricting the scope of the present disclosure. Any person skilled in the art may modify or change the above embodiments without violating the principle of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An image sensor, comprising pixel blocks spaced apart in an array, wherein each of the pixel blocks includes a photosensitive unit, an overflow unit, a transmission control unit, a reset unit, and a readout unit;

wherein the photosensitive unit and the overflow unit are respectively coupled to a transmission node, the reset unit and the readout unit are respectively coupled to a floating diffusion node, and the transmission control unit is coupled between the transmission node and the floating diffusion node;

wherein the photosensitive unit is configured to convert optical signals it receives into charge signals, wherein the charge signals include a first charge signal and a second charge signal;

wherein the transmission control unit is configured to control a conduction status of a transfer path between the transmission node and the floating diffusion node, so that the second charge signal is transferred to the overflow unit via the transmission node in an exposure phase, and the first charge signal and the second charge signal are read out based on the floating diffusion node in a quantization phase;

wherein the reset unit is configured to reset the transmission node and the floating diffusion node, and the readout unit is configured to read out the first charge signal and the second charge signal;

wherein a ratio of a charge storage capacity associated with the overflow unit to a charge storage capacity associated with the transmission node is in the range of 20 to 5000.

2. The image sensor according to claim 1, wherein the photosensitive unit includes one or more photosensitive elements and corresponding transmission transistors, a control terminal of each transmission transistor receives a first transmission control signal, a first terminal of each transmission transistor is coupled to the transmission node, and a second terminal of each transmission transistor is coupled to a first reference potential via the corresponding photosensitive element;

and/or, the transmission control unit includes a transmission control transistor, a control terminal of the transmission control transistor receives a second transmission control signal, a first terminal of the transmission control transistor is coupled to the transmission node, and a second terminal of the transmission control transistor is coupled to the floating diffusion node;

and/or, the overflow unit includes an overflow transistor and an overflow capacitor, a control terminal of the overflow transistor receives an overflow control signal, a first terminal of the overflow transistor is coupled to the transmission node, and a second terminal of the overflow transistor is coupled to a second reference potential via the overflow capacitor.

3. The image sensor of claim 2, wherein the overflow unit includes the overflow capacitor, the overflow capacitor corresponds to a first wiring, the reset unit corresponds to a second wiring, wherein a first plate of the overflow capacitor receives the second reference potential via the first wiring, and a second plate of the overflow capacitor receives a first power supply potential via the second wiring, wherein the overflow capacitor is reset when simultaneously receiving the second reference potential and the first power supply potential.

4. The image sensor according to claim 1, wherein the reset unit includes a reset transistor, a control terminal of the rest transistor receives a reset control signal, a first terminal of the rest transistor is coupled to a first power supply potential, and a second terminal of the rest transistor is coupled to the floating diffusion node;

and/or, the readout unit includes a source follower transistor and a select transistor, a control terminal of the source follower transistor is coupled to the floating diffusion node, a first terminal of the source follower transistor is coupled to a second power potential, a second terminal of the source follower transistor is coupled to a first terminal of the select transistor, a control terminal of the select transistor receives a select control signal, and a second terminal of the select transistor is coupled to a bit line;

and/or each of the pixel blocks further includes a gain unit coupled between the reset unit and the floating diffusion node for switching between different conversion gains, and the gain unit includes a gain transistor, a control terminal of the gain transistor receives a gain control signal, a first terminal of the gain transistor is coupled to the reset unit, and a second terminal of the gain transistor is coupled to the floating diffusion node.

5. The image sensor according to claim 1, wherein each of the pixel blocks includes a first device area and a second device area, the first device area includes the photosensitive unit, the second device area includes the overflow unit, the transmission control unit, the reset unit, and the readout unit, wherein the first device area and the second device area of the same pixel block are spaced apart along a first direction, first device areas of different pixel blocks are spaced apart along a second direction, and second device areas of different pixel blocks are spaced apart along the second direction, and there is a non-zero angle between the first direction and the second direction.

6. The image sensor of claim 5, wherein in each second device area, the overflow unit extends from the corresponding first device area in the second direction via the transmission node, the transmission control unit extends from the corresponding first device area in the first direction via the transmission node, the readout unit and the transmission control unit are spaced apart in the second direction, and the readout unit and the overflow unit are spaced apart in the first direction.

7. The image sensor according to claim 1, wherein each of the pixel blocks includes a third device area and a fourth device area arranged adjacently, the third device area includes the photosensitive unit, and the fourth device area includes the overflow unit, the transmission control unit, the reset unit, and the readout unit, wherein the overflow unit and the transmission control unit extend from the corresponding third device area and are symmetrically arranged on two sides of a first central axis of the fourth device area.

8. The image sensor according to claim 7, wherein for each of the pixel blocks:

the readout unit is further away from the third device area than the overflow unit and the transmission control unit are, and corresponds to the first central axis;

and/or the overflow unit extends in a third direction, which forms a first angle with a row direction, the transmission control unit extends in a fourth direction, which forms a second angle with the row direction, the readout unit extends in the row direction, the gain unit extends from the transmission control unit in the fourth direction when the pixel block includes a gain unit, the reset unit extends in the fourth direction, and there is a distance between the gain unit and the reset unit;

and/or memory elements of the overflow unit are at least disposed in a substrate;

and/or the third device area has a second central axis, and the photosensitive unit includes a first sub-transmission element and a second sub-transmission element, which are symmetrically arranged on two sides of the second central axis;

and/or, the photosensitive unit includes a first sub-photosensitive element and a second sub-photosensitive element arranged on two sides of the third device area, the overflow unit and the reset unit in the fourth device area are correspondingly arranged on the two sides of the first central axis to achieve overflow signal acquisition based on the first sub-photosensitive element, and conversion signal acquisition based on the second sub-photosensitive element;

and/or, each sub-transmission element of the photosensitive unit includes a vertical transfer gate, and the pixel blocks include square structures.

9. The image sensor according to claim 1, wherein when the pixel block further includes a gain unit, a ratio of a low-conversion-gain charge storage capacity associated with the gain unit to a charge storage capacity associated with the transmission node is in the range of 2 to 2000 and a ratio of a high-conversion-gain charge storage capacity associated with the gain unit to a charge storage capacity associated with the transmission node is in the range of 1 to 200.

10. A control method for the image sensor according claim 1, wherein the control method includes:

a reset phase: performing a first reset operation on the transmission node, the floating diffusion node, and the photosensitive unit;

an exposure phase: turning on the overflow unit, and disconnecting the transfer path between the transmission node and the floating diffusion node through the transmission control unit, so that the second charge signal is transferred to the overflow unit via the transmission node.

11. The control method of the image sensor according to claim 10, wherein the control method further includes:

a quantization phase: turning off the overflow unit, and connecting the transfer path between the transmission node and the floating diffusion node through the transmission control unit to perform quantitative readout of a first reset signal and the first charge signal based on the floating diffusion node;

and/or, turning on the overflow unit to perform quantitative readout of the second charge signal based on the transmission node and the floating diffusion node; and performing a second reset operation on the transmission node and the floating diffusion node, to perform quantitative readout of a second reset signal based on the floating diffusion node.

12. The control method of the image sensor according to claim 11, wherein in the quantization phase:

the first charge signal and the first reset signal are read before the second charge signal and the second reset signal are read, the first reset signal is read before the first charge signal is read, the second charge signal is read before the second reset signal is read, achieving quantitative readout based on the floating diffusion node;

or the second charge signal and the second reset signal are read before the first charge signal and the first reset signal are read, the second reset signal is read before the second charge signal, and the first reset signal is read before the first charge signal, achieving quantitative readout based on the floating diffusion node.

13. The control method of the image sensor according to claim 11, wherein in the quantization phase, after a select transistor of the readout unit is turned on, an overflow transistor of the overflow unit is first turned off and then a transmission control transistor of the transmission control unit is turned on;

and/or off-intervals of the selector transistor are controlled to include on-intervals of a transmission transistor, during which time the transmission transistor is turned on for charge transfer;

and/or, during quantization of the second reset signal corresponding to the second charge signal, a reset transistor of the reset unit is controlled to be turned on and then off based on a conduction status of the select transistor, wherein each time the reset transistor is turned off, the select transistor is in one of its off-intervals.

14. The control method of the image sensor according to claim 10, wherein when each of the pixel blocks includes a gain unit, the control method further includes:

a quantization phase: turning off the overflow unit, connecting the transfer path between the transmission node and the floating diffusion node through the transmission control unit, performing quantitative readout of a first reset signal under different conversion gains based on the floating diffusion node by controlling the gain unit to be first turned on and then turned off, and performing quantitative readout of the first charge signal under different conversion gains based on the floating diffusion node by controlling the gain unit to be first turned off and then turned on;

and/or, turning on the overflow unit to perform quantitative readout of the second charge signal based on the transmission node and the floating diffusion node; and performing a second reset operation on the transmission node and the floating diffusion node, to perform quantitative readout of a second reset signal based on the floating diffusion node.

15. The control method of the image sensor according to claim 11, wherein before quantitative readout of signals in the exposure phase is performed, an extra reset operation is performed on the transmission node and the floating diffusion node.

* * * * *